（12） United States Patent
Gibbs et al.

(10) Patent No.: US 8,473,334 B2
(45) Date of Patent: Jun. 25, 2013

(54) SYSTEM AND METHOD FOR ISSUING AND REDEEMING INCENTIVES ON ELECTRONIC DATA CARDS

(75) Inventors: Simon Gibbs, San Jose, CA (US); Rick Rafey, Santa Clara, CA (US); Jeffrey Dorn, Ridgewood, NJ (US); Keiji Shiotani, North Bergen, NJ (US); Linghan Cai, Fremont, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 1839 days.

(21) Appl. No.: 11/218,797

(22) Filed: Sep. 2, 2005

(65) Prior Publication Data

US 2006/0206376 A1      Sep. 14, 2006

Related U.S. Application Data

(60) Provisional application No. 60/660,190, filed on Mar. 10, 2005.

(51) Int. Cl.
*G06Q 30/00* (2012.01)

(52) U.S. Cl.
USPC ............................................................ 705/14

(58) Field of Classification Search
USPC ............................................... 705/14; 725/10
See application file for complete search history.

(56) References Cited

U.S. PATENT DOCUMENTS

| | | | | |
|---|---|---|---|---|
| 6,292,786 | B1 * | 9/2001 | Deaton et al. | 705/14 |
| 2002/0053076 | A1 * | 5/2002 | Landesmann | 725/10 |
| 2002/0107733 | A1 * | 8/2002 | Liu et al. | 705/14 |

* cited by examiner

*Primary Examiner* — Saba Dagnew (74) *Attorney, Agent, or Firm* — John P. O'Banion (57) ABSTRACT

A system for issuing, redeeming and monitoring incentive offers generated in response to qualifying on-line and off-line non-purchase activities. For example, an electronic data card is used to store electronic coupons issued by web sites (i.e., on-line) and/or off-line locations. In one embodiment activity registration is performed by programming integrated with, or coupled to, a web browser. Off-line activity is registered by a kiosk at a merchant location that generates an incentive offer, or a token which is later converted to an incentive offer, in response to conditions determined at the kiosk (e.g., entered by the user, clerk, and so forth). A loyalty server operates to aggregate information about the offers for reporting purposes, and can be optionally required for determining qualification for an incentive offer, providing security codes for participating incentive issuers, providing qualification of offers prior to issuance, and validating stored offers prior to redemption.

20 Claims, 4 Drawing Sheets

SYSTEM AND METHOD FOR ISSUING AND REDEEMING INCENTIVES ON ELECTRONIC DATA CARDS

CROSS-REFERENCE TO RELATED APPLICATIONS

This application claims priority from U.S. provisional application Ser. No. 60/660,190, filed on Mar. 10, 2005, incorporated herein by reference in its entirety.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND OF THE INVENTION

1. Field of the Invention

This invention pertains generally to electronic data cards, and more particularly to methods used for handling purchase incentives associated with the use of electronic data cards.

2. Description of Related Art

Electronic data cards are being increasingly used within the transactions infrastructure. These cards contain electronics and memory for the storage of account information and are adapted to communicate in secure wired or wireless configurations. The card holder of an electronic data card can accrue rewards for using their card, such as from the card issuer. Credit card holders are familiar with being issued rewards (e.g., points, discounts, and so forth) for making purchases, either on-line (i.e., Internet web sites) or off-line (i.e., at retail locations). In these situations rewards result from a payment transaction and are realized when the card issuer processes the transaction. Currently these rewards are tied to the card because the card issuer has access to statistics on user transactions made with the card. The reward programs which can operate on electronic data cards are generally configured similar to those of traditional credit cards.

Coupons are commonly used as an incentive to purchase a product or service. Traditional paper coupons are distributed in many ways, such as via newspapers and magazines, bulk mail, brochures in retail locations, and so forth. For on-line activity, the use of electronic coupons, often referred to as "eCoupons", essentially provide a set of "codes" that may be entered on-line, or which can be printed and distributed in the same manner as paper coupons. An electronic commerce, "e-commerce", site might include a "coupon field" on a checkout page, or the like. Entering a valid value into the field could result in a discount being offered.

However, eCoupons can also be distributed purely electronically, for example by electronic mail (email), by utilizing a copy and paste technique from web sites, by utilizing cookies, and so forth. One of the problems with electronically distributed eCoupons is that they are difficult to use, leaving the user to copy coupon code information from one application to another (i.e., email to web browser) or one web page to another.

Another drawback with the coupon use is that both the distribution and redemption of the coupons is not fully controllable. For example, in the scenario in which a coupon value is typed or pasted into a coupon field, the coupon code could be distributed and used by any number of parties. A number of similar problems exist which currently limit the effectiveness of these present incentive mechanisms.

Considering these drawbacks, it will be recognized that the providers of on-line services, and even off-line services, do not have a convenient means of rewarding users for non-purchase activities, such as visiting a web site, completing a web form, clicking on a specific link on a web page, visiting a store, participating in a product demonstration, filling out a survey, and so forth.

Accordingly a need exists for a system and method for issuing and redeeming non-purchase activity incentives in association with an electronic data card. Convenience is enhanced as the user issues, and/or redeems incentives either online of offline.

BRIEF SUMMARY OF THE INVENTION

The present invention is associated with electronic data storage cards (i.e., Smart cards, Digital wallets, electronic transactions devices, and so forth) having storage for retaining incentive offers and preferably incorporating near-field communication (contactless) technology. The system provides for the generation of non-purchase activity-based incentive offers. By way of example and not limitation, these offers can be generated from a loyalty server or systems associated with any organization. The incentives can be issued or redeemed at any time when the electronic data card is interfaced with a system that can communicate with the data card.

The electronic data card device may be configured for either wired or wireless connectivity with a computer device having a reader and/or writer device that has connectivity over a network to the loyalty computer (i.e., server). The term electronic data cards as used herein includes the use of a number of portable memory bearing devices configured for establishing interconnectivity with a reader-writer device. For example this group of devices include smart cards, digital wallets, cellular phones, personal digital assistants, FLASH drives, and similar devices. In one embodiment, for users that do not desire off-line incentive activity, the memory bearing device can be coupled to or integrated with aspects of a non-portable computer based system, such as within a home personal computer system.

The system and method provides mechanisms for the issuance, storage, and redemption of incentives in relation to the interconnectivity of the electronic data card, or use of a transaction device configured for similarly storing incentive offers.

By way of example, and not limitation, programming is integrated with or coupled to a web browser so that browsing activities which match criterion of an incentive issuer result in the issuance of incentives for storage on the electronic data card in response to on-line activities. The electronic data card is configured for storing information according to a plurality of incentives and for communicating with a computer configured for registering activities. Off-line activity is registered by a kiosk at a merchant location that generates an incentive offer, or which generates a token which is later converted to an incentive offer, in response to conditions determined at the kiosk. For example conditions at the kiosk can be met in response to entry of information by the user or a clerk, met automatically in response to establishing interconnectivity with electronic data card at that location, met in response to performing an action (e.g., taking a survey, listening to a presentation, applying for in-house credit, and so forth) at a location in which interconnectivity with the electronic data card is established, and so forth. A loyalty computer (i.e., server) operates to aggregate information about the offers for reporting purposes, and can be optionally required for determining qualification for an incentive offer, providing security codes for participating incentive issuers, providing qualification of offers prior to issuance, and/or validating stored offers prior to redemption.

An aspect of the invention is to provide a system and method for controlling electronic incentive (e.g., coupon, reward, free offer, discount, free gift certificate, and so forth) issuance and redemption based on on-line and off-line activity other than purchases.

The invention is amenable to being embodied in a number of ways, including but not limited to the following descriptions.

One embodiment of the invention can be generally described as an apparatus for executing an incentive program based on electronic data card devices for providing incentives for non-purchase activity, comprising: (a) an electronic data card application coupled to a first computer (e.g., browsing device such as user PC or shared PC, or an offline non-browsing device such as a kiosk or point of sale system or similar), and configured for accessing an electronic data card in response to establishing connectivity between the data card and the first computer; (b) a card identification means configured for identifying any electronic data card (i.e., by a unique card identifier which can be associated with a particular user during the registration process and optionally subject to additional user authorization/identification) being accessed by the first computer which has been registered for use within a non-purchase incentive offer program; (c) an activity registration means (i.e., reward agent) configured for detecting on-line or off-line non-purchase activities in association with an electronic data card being accessed; (d) an incentive generation means configured for generating incentives for storage on the electronic data card being accessed in response to selected activity being registered by the activity registration means with regard to an issuing web site or location (i.e., kiosk); and (e) a usage data generation means configured for registering incentive issuance and/or redemption in response to the electronic data card being accessed to provide usage data.

The card identification means in one embodiment can comprise card application programming executed on the first computer interfaced to a card reader-writer device to which an electronic data card can establish a communication connection (interconnectivity). Card activity registration means can comprise either on-line non-purchase activity registration programming configured for execution on the first computer during user browsing to capture non-purchase on-line activities of the user in combination with browsing of web sites, or it may comprise off-line non-purchase activity registration programming configured for capturing activity information from a kiosk (or other non-browsing device configured for registering activity for which incentive offer issuance is based) in response to an off-line activity which can be identified by the kiosk.

The incentive generation means according to one embodiment of the invention comprises programming operable on a second computer (i.e., as loyalty server), or on the first computer (i.e., as kiosk) for generating one or more incentives for storage on the electronic data card in response to the registered activity.

The usage data generation means according to one embodiment of the invention comprises programming operable on a second computer, preferably a loyalty server, which receives information from a plurality of the first computer systems. Usage data is thus collected with respect to incentive issuance and redemption. Additionally, the second computer, such as generally referred to herein as a loyalty computer or loyalty server, can be utilized for regulating incentive issuance or redemption, for example converting tokens from a merchant into redeemable offers.

An embodiment of the invention can be generally described as an apparatus for executing a program of electronic non-purchase activity generated incentives for storage on an electronic data card within a plurality of data cards associated with participating users of the incentive program, comprising: (a) a first computer configured for communicating over an electronic network and adapted for reading and writing data from an electronic data card having memory configured for aggregating information about incentive offers; (b) incentive offer issuance programming operable on the first computer for, (b)(i) detecting the presence of an electronic data card having connectivity with the first computer, (b)(ii) reporting activity arising from non-purchase actions performed within either a web site context of a browser executing on the first computer, or within a physical location context of the first computer from which incentives are offered, (b)(iii) generating an incentive offer from the first computer in response to select non-purchase activities comprising either generating an incentive in response to matching on-line activity with the criterion for issuance of the on-line offer by a given web site, or generating an incentive offer in response to the first computer, kiosk, being configured by an incentive offer issuer for determining qualification for the off-line offer and issuing the incentive, (b)(iv) storing the incentive offer received in response to non-purchase activity within the electronic data card; (c) incentive offer redemption programming operable on the first computer for, (c)(i) detecting the presence of an electronic data card having connectivity with the first computer, (c)(ii) displaying available incentives stored on the electronic data card, (c)(iii) detecting if any available incentives stored on the electronic data card are redeemable at a web site being accessed or within the first computer associated with a physical location, (c)(iv) displaying redemption options and collecting user input on offers to be redeemed, (c)(v) executing redemption of one or more incentives stored on the electronic data card and erasing or inactivating redeemed incentives; (d) a second computer configured for communicating over the electronic network with the first computer; (e) programming operable on the second computer for aggregating information received from a plurality of first computers about off-line and on-line activity. Alternatively, or more preferably additionally, the second computer further comprises programming for determining (e.g., which offer, which value, what conditions, what expiration, and so forth) and/or validating the incentive offers (e.g., controlling or regulating issuance or redemption) generated by the first computer. The second computer (loyalty computer) is thus in the loop for issuing or redeeming the incentive offers, thereby providing increased security and control of the system.

An embodiment of the invention can also be generally described as a method of issuing, redeeming, and monitoring incentive offers which are generated for on-line and off-line non-purchase activity, the incentive offers are stored on an electronic data card, comprising the steps of: (a) accessing an electronic data card having memory configured for aggregating incentive offers retained in an electronic form (i.e., typically the user needs no additional paper coupon or non-electronic elements to redeem the offer); (b) issuing incentive offers for storage on the electronic data card in response to either matching on-line actions performed within a web site context of a browser with issuance criterion, or determining qualification for an off-line offer within a kiosk in response to accessing the electronic data card in an off-line context; (c) redeeming incentive offers stored on the electronic data card in response to detecting if any available incentives stored on the electronic data card are acceptable for redemption upon submission to a web site or at a kiosk; and (d) generating usage data based on aggregating incentive offer issuance and redemption information.

It should be appreciated that although the present invention beneficially provides for all electronic issuance, redemption and control of incentive offers, aspects herein can be utilized in many cases in combination with conventional incentive processing, such as the use of paper coupons, or coupon string entry, without departing from the teachings of the present invention.

Alternatively, or more preferably additionally, the method includes determining whether or not to store an incentive offer on the electronic data card of the user in response to user selected incentive offer acceptance criterion. In addition, incentive offer issuance or redemption can be subject to processing by a loyalty computer (i.e., server) to increase security and control in the system. The issuing of incentive offers based on off-line activity within a kiosk, or similar device, can be configured for responding to the storage of an activity token in response to the off-line activity, and then conversion of the activity token by the loyalty server in response to communication being established between the kiosk and the loyalty server.

Described within the teachings of the present invention are a number of inventive aspects, including but not necessarily limited to the following.

An aspect of the invention is to provide an incentive system in which usage data is provided to an organization operating the incentive system, such as to programming within a loyalty computer or server.

Another aspect of the invention is for a loyalty server to track activity between users and participating organizations for generating statistics to card issuer or other organization providing the loyalty service.

Another aspect of the invention is for a loyalty server to interact during the process of incentive offer issuance and redemption to increase security and control of the incentive program.

Another aspect of the invention is to provide an incentive system in which incentives can be based on any non-purchase activity, such as selected on-line browsing, filling out forms, and other interaction between the user and a web site, or the user and a physical-merchant, organization, event, and so forth.

Another aspect of the invention is to provide an incentive processing system in which all coupon data can be retained in an electronic data card, or transaction device having electronic data card functionality.

Another aspect of the invention is to provide a system in which an application operates in conjunction with a web browser for detecting the select activities associated with a web site that qualify for rewards.

Another aspect of the invention is to provide for automatically detecting which incentives are redeemable at the current web site being visited by the user.

Another aspect of the invention is to provide a system in which incentive offers are generated at a kiosk or other location-based incentive offer issuer such as performed automatically or in response to user or clerk input, or other location based input.

Another aspect of the invention is the preloading of the electronic data card with incentives when the card is issued or activated.

Another aspect of the invention is to provide different categorization and/or prioritization of offers, and the management thereof by the user.

Another aspect of the invention is to provide storage of activity tokens (e.g., on electronic data card, or kiosk) which can be converted to incentives by the loyalty computer programming at a later time.

A still further aspect of the invention is to provide for the maintenance of incentives by the user, deletion of unwanted offers, and optionally the exchange of offers with other participants.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only.

DETAILED DESCRIPTION OF THE INVENTION

Referring more specifically to the drawings, for illustrative purposes the present invention is embodied in the apparatus generally shown in FIG. 1 through FIG. 4. It will be appreciated that the apparatus may vary as to configuration and as to details of the parts, and that the method may vary as to the specific steps and sequence, without departing from the basic concepts as disclosed herein.

1. Introduction.

In accordance with the invention, an electronic data card incentive issuance and redemption system allows the card issuer, or other party maintaining the incentive system, to provide rewards for on-line activity across web sites without requiring web site integration. An electronic data card (e.g., Smart Card) is used for identifying a user or a particular device to which the user is typically associated, and for storing incentives and the redeeming of incentives stored on the card. It should be appreciated that the electronic data card may actually be implemented as any form of electronic card or device configured with both memory and connectivity, and optionally adapted with security and transaction features. Incentive storage and redemption according to the invention can be integrated with a number of different devices.

By way of example the electronic data card is any portable memory bearing device configured for establishing interconnectivity with a reader-writer device. The electronic data card device can include any of the following device, listed by way of example and not limitation: smart cards, digital wallets, cellular phones, personal digital assistants, FLASH drives, and so forth which are configured for storing electronic-based incentives and for providing interconnectivity in relation to the receipt and redemption of the electronic coupons.

By way of example and not limitation, the electronic data card can comprise either wireless or wired devices. Examples of suitable wireless devices (without electrical contacts for establishing connectivity), include any mobile electronic devices having memory and wireless connectivity, wireless Smart cards, personal digital assistants with wireless connectivity, cellular telephones, memory devices with wireless connectivity, personalized RFID devices, and so forth. Examples of suitable wired devices, include contact bearing smart cards, memory modules, FLASH drives, USB devices, PDAs, and the like.

A loyalty computer (i.e., implemented on a server) can track the interaction between users and participating organizations (on-line or off-line) to provide additional information to the issuer, or other party associated with the loyalty computer. In addition, the loyalty computer can interact during issuance and redemption to provide additional benefits, such as added security and control of the issuance and redemption program.

A first computer is configured with an electronic data card identification means configured for identifying any electronic data card being accessed by the computer which has been registered for use within a non-purchase incentive program. In one embodiment the identification means comprises an application for identifying and accessing the electronic data card, such as incorporating a wired and/or wireless reader-writer means. It should be appreciated that the term first computer used herein denotes either a single processor device, multiple processors, or distributed processing elements which are generally adapted for executing programming associated with interfacing to a reader and/or writer device configured for use with the electronic data card. By way of example and not limitation, the reader-writer can be supported on the computer, such as on a peripheral, in a keyboard, on a kiosk, in a point of sale (POS) system, in a separate coupon generating system or peripheral, and the like. Optionally, the first computer can interface with electronic data cards that include one or more security features, such as biometric identifiers, personal identification numbers and passwords, and other forms of security.

An activity registration means within the first computer is configured for detecting on-line or off-line non-purchase activities in association with the electronic data card being accessed. According to one embodiment or mode of the invention, the activity registration means comprises application programming on the first computer which is configured for operating in combination with a web browsing application (or integrated within the browser or other application capable of browsing) to register activities in relation to the browsing activity. In this scenario the first computer typically comprises the personal computer of the user which supports Internet connectivity. Alternatively, browsing may be accessed in other ways, for example, the first computer may represent a laptop computer or personal digital assistant (PDA) of the user, a shared computer at an Internet café, a kiosk configured with web access, a wireless personal portable device with Internet connectivity and the like.

The first computer may also be adapted to incorporate the electronic data card features for "non-mobile" users that will collect and redeem all incentives on-line.

The first computer can also comprise a device which is associated with a merchant or other organization desiring to issue coupons or other incentives at or in response to a physical location or physical activity. The computer in this scenario needs only to provide intermittent network connectivity. For example the first computer may be associated with the generation of incentives from: a merchant location, kiosk, portable merchant-coupled computer at an event, and so forth. Typically, in this scenario the computer is not used for "browsing" per se by the patron. These incentives are not generated in response to browsing, but are generated in response to manual triggers (e.g., user or clerk inputs), a dedicated application, as additional programming on a point of sale system, and so forth.

An incentive generation means is configured for generating incentives for storage on the electronic data card being accessed in response to selected activity which matches the activity criterion of an issuing web site or an organization associated with a kiosk, or similar location-based incentive. The incentive generation means in one embodiment comprises programming operable on the first computer, or a computer in communication with the first computer, for generating incentive offers for storage on the electronic data card in response to matching the on-line or off-line activity of the user with the activities proscribed by a particular organization for receiving a given incentive offer. Embodiments can be created in which the incentives are generated from visited web servers, or from the first computer associated with a kiosk or similar. Alternatively, or additionally, incentives can be generated from a computer (second computer) which executes programming of a loyalty program. The second computer can be configured to generate incentive offers in response to qualification and activity information.

The second computer (or plurality of such computers) in one embodiment can be considered a usage data generation means. The second computer is generally configured for collecting usage data for the incentive program and/or for the processing of incentives communicated from the collection of first computers which are connected to the second computer via a network, such as the Internet. In one embodiment, loyalty services are performed on the second computer tying together the various incentive programs, tracking issuance and collection of incentives, providing any desired level of security to the user, and/or providing additional services. Typically, the second computer comprises a series of web servers which provide loyalty services to a range of issuing merchants and organizations, while supporting incentive collecting and redeeming by a user community. In one embodiment, both the merchant and user communities must register prior to executing loyalty services. User information for the system may be stored on the electronic data card, stored in a database associated with the loyalty program, or even stored on the first computer.

The loyalty services provided by the invention allows the user (e.g., "cardholder") to be rewarded for on-line and off-line activity according to rules of the issuer of the incentive.

Figure 1:
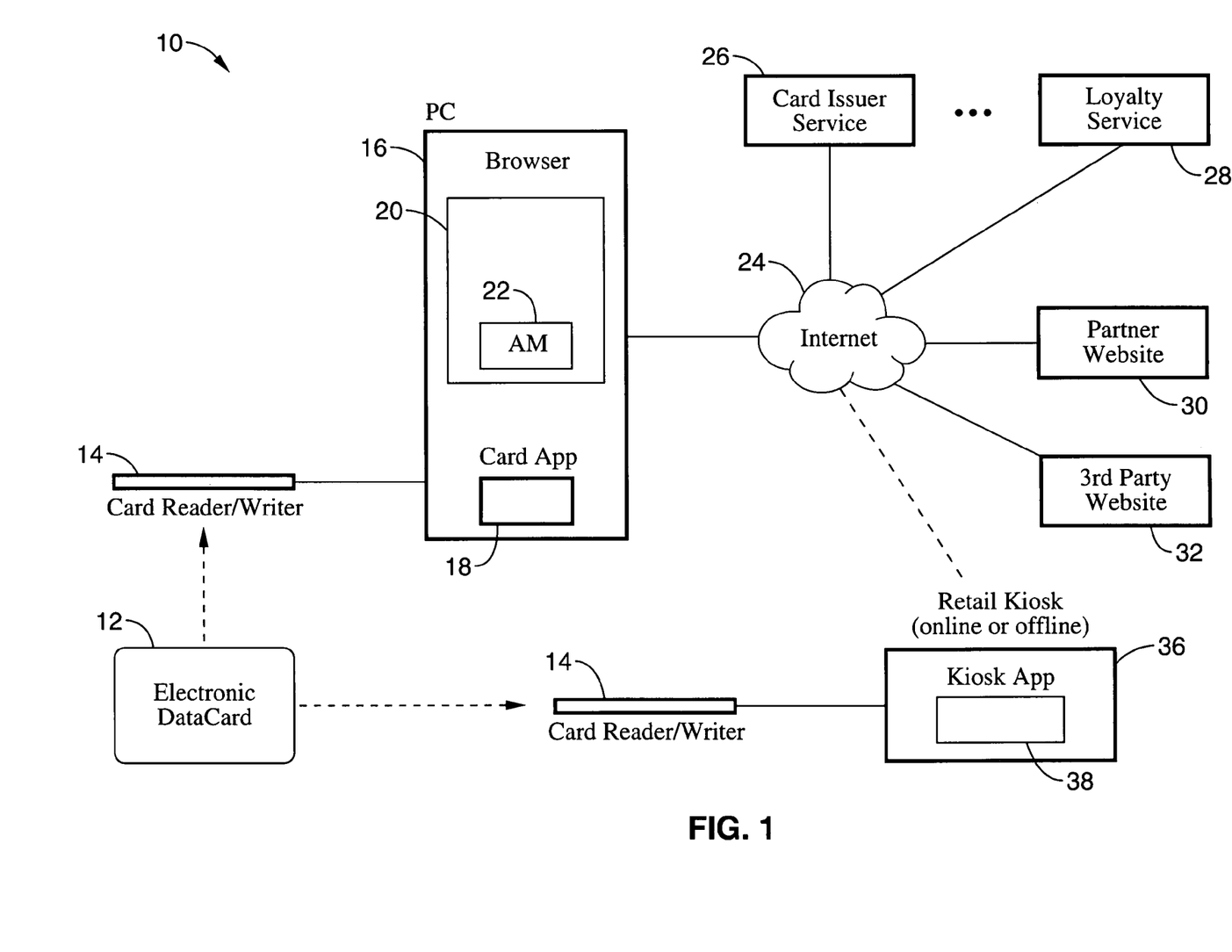
FIG. 1 is a block diagram of an electronic data card incentive issuance, collection and redemption system according to an aspect of the present invention.
Figure 2:
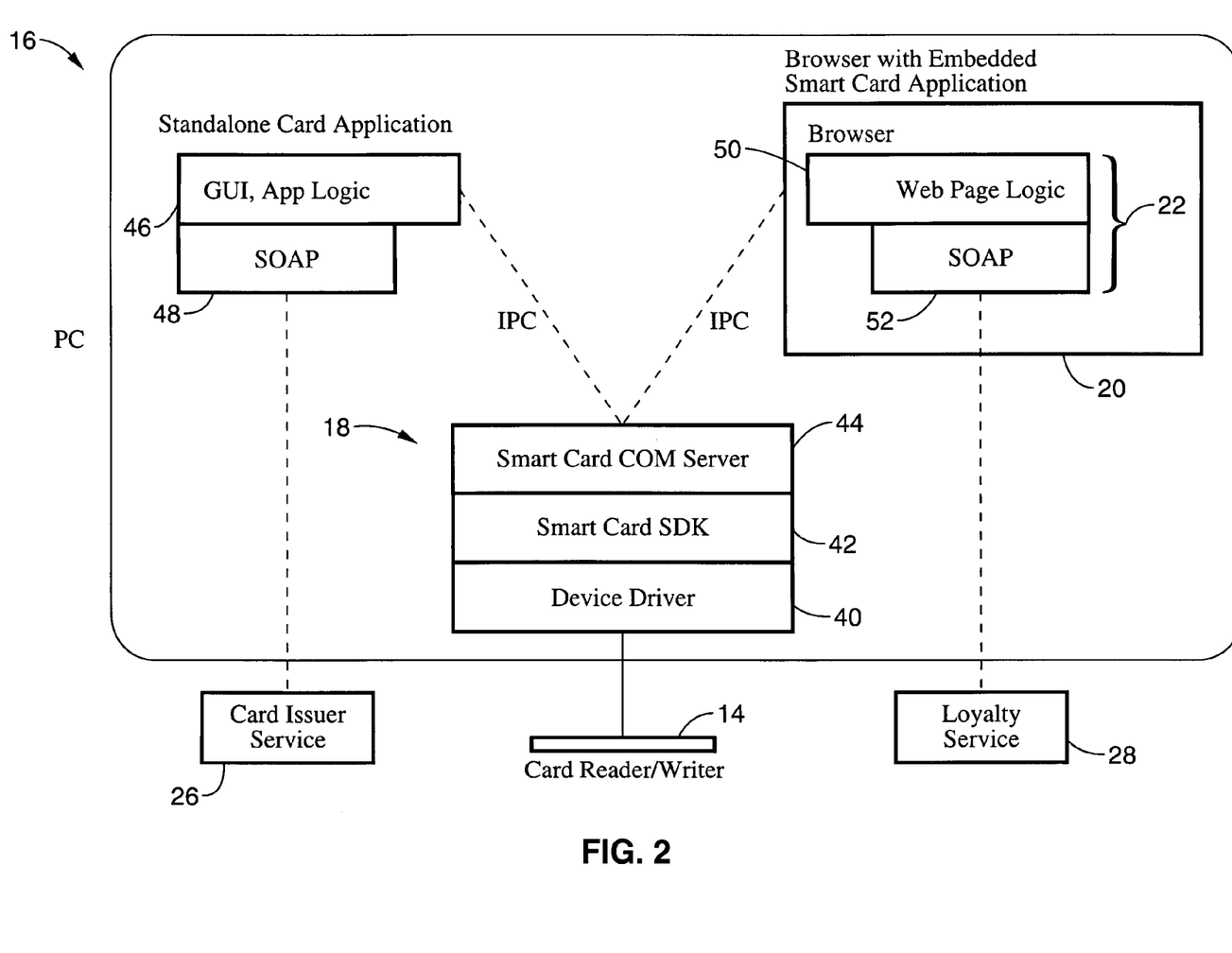
FIG. 2 is a block diagram of the architecture within a first computer adapted for reading-writing the electronic data card and for communicating with a loyalty processing computer over a network according to an aspect of the present invention.
Figure 3:
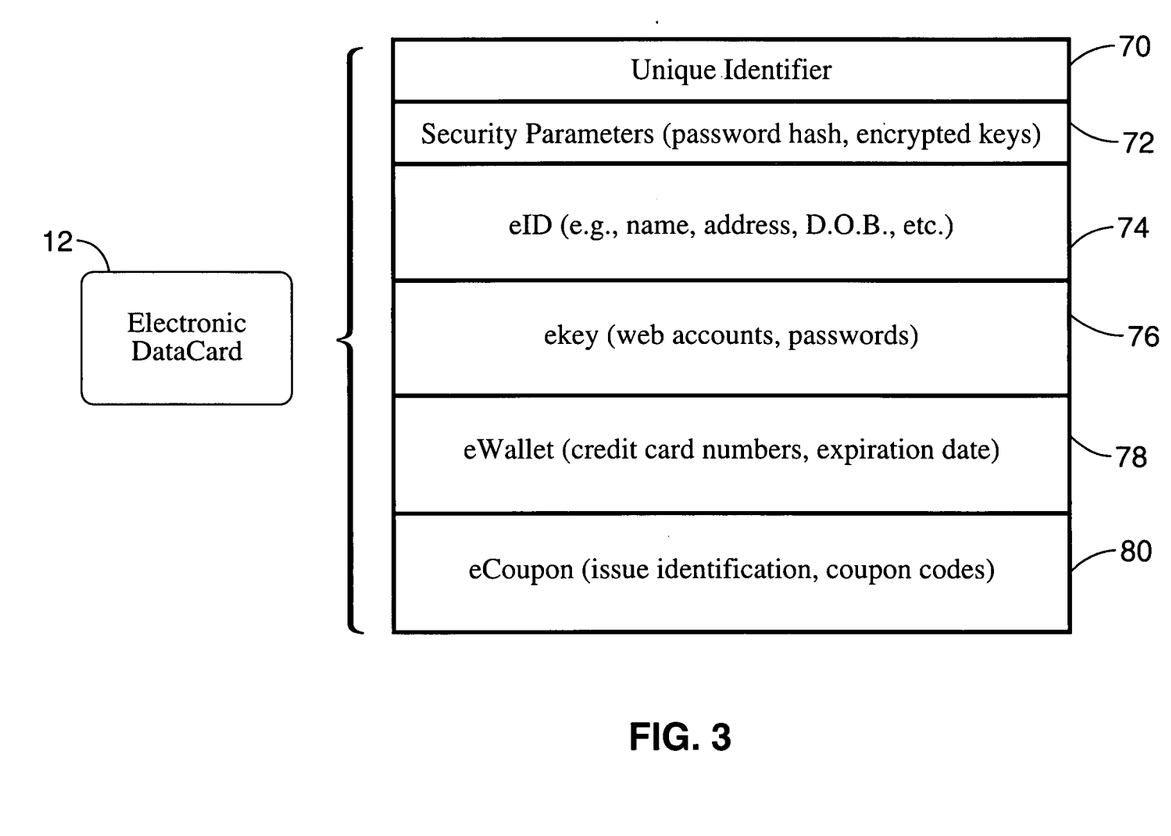
FIG. 3 is a data schema of a data card with its associated stored data according to an aspect of the present invention.
Figure 4:
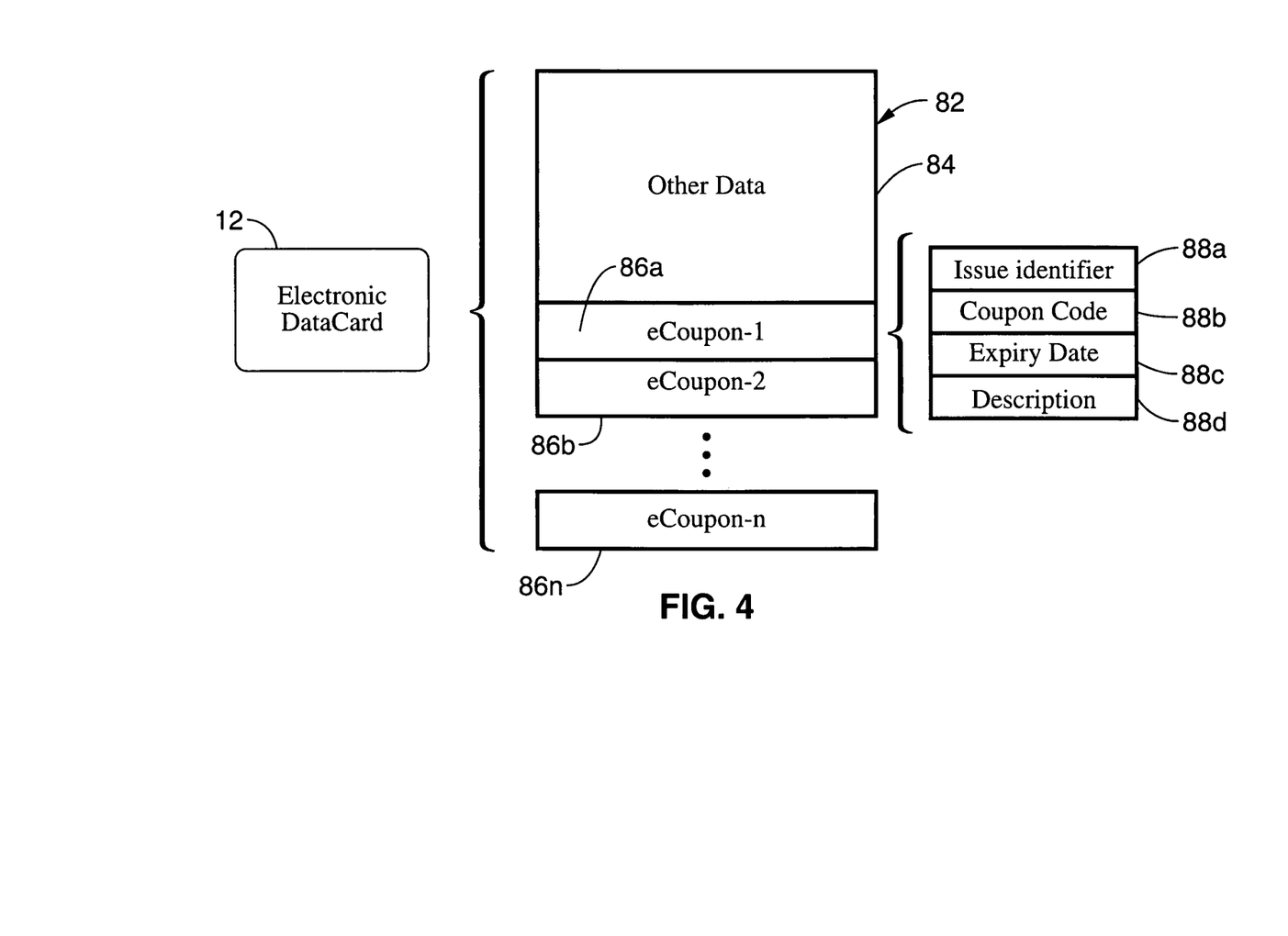
FIG. 4 is a data schema of a stored electronic coupon format according to an aspect of the present invention.

FIG. 1 and FIG. 2 show the overall structure of the system, while FIG. 3-4 illustrate examples of the data contained in the electronic data card and for each electronic coupon.

Illustrated in FIG. 1 is an example embodiment 10 of the incentive issuance and redemption system. An electronic data card 12 is shown for use with the system and it contains a means for establishing wired and/or wireless connectivity with external devices and internal memory for retaining information about the incentives. A reader-writer device 14 is exemplified which may be adapted with electrical contacts for establishing a connection to cards having connection-based wired connectivity. Card reader-writer 14 may be integrated within the PC (i.e., with slot for wired card connectivity), an external device (i.e., USB connection to a small housing), or be integrated into other devices (i.e., printer adapted for receiving data from data cards). Optionally, a wireless connection can be established, wherein communication access is established in response to proximity or manual activation of the communication on the device operating with electronic data card features.

A first computer 16, such as the network enabled personal computer of the user, or a laptop or personal digital assistant subject to connectivity at home or when traveling, is configured with a card application 18 to allow communication with electronic data card 12 through card reader-writer 14.

First computer 16 could also comprise computers adapted for web browsing that are accessible to the user and referred to herein as "shared browsing devices". These shared browsing devices may be located at work, at a library, at a friend's house, at a web café, or at a kiosk supporting a shared browsing mode. According to one embodiment of the invention, additional security procedures and communications are activated within the system when first computer 16 comprises a shared browsing device, because the device is not registered to the user and does not contain certain user information, such as acquired during a registration process.

An application means for accessing organizations over the network, such as Internet 24, is exemplified with a browser application 20 having non-purchase reward agent (RA) programming 22 for operation within, or in combination with, browsing application 20. By way of example the browser application can comprise a conventional Internet browser, such as Microsoft Explorer®, Mozzilla FireFox®, Netscape Navigator®, and/or other programs configured for providing similar connectivity over a network.

The electronic data card may be issued by a card issuer service 26, which also has connectivity, preferably secure, with Internet 24. A loyalty service 28 oversees the incentive programs including issuance and redemption processes, and may operate as a second computer as described above, preferably comprising one or more network servers. The loyalty computer is adapted, at least in one operating mode, for securely communicating over Internet 24.

The first computer 16 is configured for communication with the second computer of the loyalty service 28 over the Internet. Optionally the loyalty service may be associated with the card issuer service, or may otherwise have secure connectivity through which cardholder information may be passed.

Partner websites 30 are illustrated which support aspects of the incentive processing according to the present system. These organizations are typically merchants or other organizations which can be browsed by the user and support incentive issuance and/or redeeming. It is generally preferable that secure connectivity not be necessary for partner websites.

Third party websites 32 can be browsed by the user at PC 16 for registration by the reward agent (RA) programming 22, although they may or may not support incentive issuance or redemption. There is no restriction on operations of third party websites according to the invention.

Another application of the system is depicted with regard to a kiosk 36 which is configured with a kiosk application 38 that controls a reader-writer 14 for communicating with electronic data card 12. The kiosk-based incentive system provides for location-based incentive issuance or redemption, and does not support web-browsing in this mode except for support of a shared browsing mode as described above. Although kiosk 36 may have permanent connectivity with the internet, it may also only support periodic access (i.e., once daily). No real-time access is necessary for kiosk 36, which may comprise a standalone device, or it may be associated with a merchant and coupled to, or integrated with, any existing merchant communication infrastructure, such as point of sale systems. The kiosk may also be deployed at temporary sites, such as events, and the like.

The kiosk can provide a number of services. The kiosk can provide for registering an activity for which incentives may be available when the user next connects to the loyalty service. For example at an event, the user may insert their card into the reader wherein their presence at the event can be logged onto the card, by way of a token that contains event and issuer information. The activity information (i.e., token) can alternatively be stored in the system of the kiosk, wherein upon at some later time it is connected to the Internet and communicates the activity data for each use to the loyalty system which then updates the account of the user. Each token preferably includes a validation means, for example as supplied to the issuer near the time of issuance as a serial number (i.e., within a series of them provided to the kiosk), to assure that the token is valid and that the kiosk generating the token is associated with and in good standing within the loyalty program.

FIG. 2 illustrates applications running in PC 16 according to an embodiment of the invention. The embodiment of FIG. 2, as well as that of FIG. 3-4, are described as specific to an electronic data card comprising a Smart Card, to which the system is particularly well-suited, although it should be appreciated that other devices having memory and external connectivity may be similarly supported.

Card reader and/or writer 14 is interfaced to a card processing application 18 exemplified with execution layers comprising a device driver 40 for controlling the low level hardware, a logical device layer such as from a Smart Card SDK (Software Development Kit) 42, and a Smart card common object module (COM) server 44 providing a command interface for access within the system.

Standalone card application 18 is shown comprising a graphical user interface (GUI) 46 along with programming to control a simple object access protocol (SOAP) 48. SOAP can be generally considered to be a protocol used for client-server communication that sends and receives information "on top of" HTTP. In one implementation the data sent and received is in a particular XML format specifically designed for use with SOAP. It should be appreciated embodiments of the present invention need not incorporate SOAP but may utilize any desired network connectivity protocols or mechanisms without departing the teachings herein.

A browsing application 20 is illustrated with reward agent programming 22 that in this embodiment comprises web page logic 50 and secure communications programming (i.e., SOAP) 52 with the Internet.

FIG. 3 illustrates, by way of example, data structures retained within a version of the electronic data card 12. A unique identifier 70 allows the system to uniquely determine one data card from another. This data is used during registration of the card after issuance and identifies the card for each system access.

Optional fields 72-78 are shown comprising the following. Security parameters may be provided 72, such as a password hash, encrypted keys, and the like. Identification of the user can be retained 74, for example name, address, date of birth (D.O.B.), and so forth. It will be appreciated that access to this and other user information may be provided in a hierarchical form associated with security provisions to control information dissemination. Information for controlling access to partners and third parties can be provided in a set of ekeys 76, such as web accounts, passwords, and so forth. Transaction account information 78 may be retained, such as eWallet parameters including credit card access codes (i.e., numbers), expiration dates, security codes, and so forth.

Finally, a portion of the memory 80 within the device is configured for retaining electronic incentives which could be generally referred to as "eCoupons". It should be noted that the storage of account information (fields 72-78) is described for the case of eCoupon storage within a Smart Card or similar which also supports transaction functionality, but these fields are not generally necessary for supporting non-purchase based incentives according to the present invention.

FIG. 4 illustrates by way of example a data region 82 having other data 84 as well as a number of eCoupons 86a, 86b through 86n. By way of example, the fields within an eCoupon are shown comprising an issue identifier 88a, coupon code 88b, expiration (expiry) date 88c, and coupon description 88d.

It can be seen that an embodiment of the system can also be described in terms of a method of issuing, redeeming, and monitoring incentive offers which are generated for on-line and off-line non-purchase activity. The incentive offers are stored on an electronic data card, or other memory bearing device, such as a Smart Card, Smart Wallet, cellular phone, personal digital assistant, and so forth which is also preferably configured for executing purchase transactions (i.e., transaction device).

The inventive method comprises accessing an electronic data card having memory configured for collecting incentive offers, such as retaining sufficient information in an electronic format for redeeming any of these offers. Typically, information for an electronic coupon would contain offer information which would be unique for the given organization and offer provided by that organization, as well as an identifier for the specific incentive to prevent others from copying the incentive. Once the data card device is connected to (has established connectivity with) an on-line or off-line organization offering incentives (e.g., merchant, vendor, bank, business, government, non-profit, and so forth), then the activity of the user in relation to the entity is tracked, or information retrieved from the card itself, to determine if the card, or more typically the user associated with a given card, qualifies for one or more incentive offers. The incentive is then generated in response to the activity.

The activities described according to the present invention are non-purchase activity, which entails the user receiving an offer in response to activity that is not tied directly to a purchase. By contrast, purchase-based incentives are known by which users receive a rebate, discount, frequent-flier miles, or the like based on the execution of a purchase. The non-purchase activity for which the user receives the incentive according to the present invention is not directly in response to the purchase, although they can be issued at the time of purchase, but are responsive to activities outside of, or which extend beyond the purchase itself. In one embodiment a purchase may comprise an additional qualifier for issuing the incentive offer, but in a preferred embodiment is not in itself the activity for which the incentive offer is issued.

Issuing of the incentive offer into the electronic data card arises in response to either matching on-line actions performed within a web site context of a browser with issuance criterion, or determining qualification for an off-line offer within a kiosk (or similar location-based electronic equipment) in response to accessing the electronic data card. In one aspect of the invention, the user is required to provide additional information for receiving and/or redeeming an incentive offer, wherein one embodiment of the invention is configured for automatically populating at least a portion of the information fields contained within an associated data form from information available to the electronic data card (i.e., access to which is controlled by a security mechanism), the first computer, or the second computer maintaining the loyalty program.

One optional feature of the system allows the user to determine whether or not to store an incentive offer, for which the user has qualified, on the electronic data card in response to user selected incentive offer acceptance criterion. This feature allows the user to control what offers they want to store, wherein they need not waste device memory space and their associated time in managing incentive offers. User selection can be performed in response to user configuration setting which automatically restrict which offers are accepted. For example the selection criterion can be based by vendor, vendor location, offer expiration, type of offer (e.g., two-for-one offer, purchase discount, rebate, and so forth), discount provided (e.g., percentage of discount, limitations on use), preferred vendor list, and the like.

In addition, the selection of offers can be subject to manual input from the user on an offer-by-offer basis. In addition, the system is preferably configured to allow the user to select which offers are put into a list of foreground offers and which are retained at lower priority as background offers. In this way the user need not eliminate offers of low value, or probable use, but can relegate them to a low priority (no user overhead) wherein if a redemption situation arises the user can then make use of the offer. It will be appreciated that overhead can be associated with offers of high value because the user will want to be sure they have a chance to avail themselves of the offer, wherein the system can generate alert reminders to the user, or otherwise annunciate (i.e., display) these offers for user consideration at an appropriate time.

Redeeming of the incentive offers stored on the electronic data card is performed in response to detecting if any of these available incentives are acceptable for redemption at a given web site or at a kiosk. A matching process is attempted between the offers held by the user on the electronic data card (or optionally on a transaction device, or even fixed system which retains information otherwise associated with the electronic data card holding the incentives) and the incentive issuer, or a proxy of the issuing merchant (e.g., loyalty program maintainer, partner thereof, or so forth).

Usage data is then generated in response to aggregating incentive offer issuance and redemption information, such as by a loyalty computer. In a preferred embodiment, the loyalty computer is also involved in the issuance and/or redemption of offers. For example, the loyalty computer programming can be configured for generating the incentive offers based on qualification information provided by incentive issuers, or to qualify offers prior their issuance or redemption. The loyalty computer preferably comprises a network enabled computer, such as a web server, which can communicate with a plurality of computers which are configured for processing incentive offers, accessing the electronic data card of the user, and/or a combination thereof.

As can be seen from the above the system can be implemented in a number of ways for supporting the issuance of coupons, and other incentives, in response to on-line (i.e., Internet browsing) or off-line (i.e., visiting a partner site kiosk) non-purchase transactions. The incentives are stored on the electronic data card for subsequent electronic redemption over the system. A number of aspects of the system are now described in greater detail.

2. Electronic Data Card Activation.

The present system is configured to provide rewards for on-line and off-line activity which are stored on an electronic data card that may be obtained solely for retaining the rewards, or more preferably as reward information stored on a device having memory and connectivity, and more preferably on a device that further provides transaction services (i.e., purchases).

The following considers the case of a Smart Card having transaction functionality as well as the storage of incentive offers. The user activates their electronic data card, such as by using a standalone or web-based application. This activation allows the Card Issuer Service to initialize the card, and it also triggers registration of the user and card with the Card Issuer Service and the Loyalty Service.

3. Reward System for On-Line Use of an Electronic Data Card.

The user is given incentives/rewards in response to non-purchase browsing activity performed over the Internet. The user starts a web browser, and may or may not be required to "open" the card by providing a password. The use of security, such as password or biometrics and the like, allow electronic data card applications to access encrypted data on the card.

When a user performs a non-purchase action within the browser it is detected by the programming. Examples of this activity comprise on-line activities such as loading a page, loading a series of pages, answering a question(s) about content on a page after viewing, entering data on a form, responding to a questionnaire, signing up for a promotional newsletter, providing a review of an item or merchant, entering a suggestion, and so forth.

The programming coupled to, or integrated within, the browsing application in association with the electronic data card application registers select activities associated with available incentives preferably at partner sites and reports the activity to the Loyalty Service. In one embodiment the system provides the user with controls for selecting extent of any information provided to the partner sites, the type/nature/conditions under which incentives are to be accepted, and other user security mechanisms. The report can include any or all of the following fields of information: unique identifier for card, user identification, type of action, web site, full or partial URL, full or partial source of web page, history, cookies, and so forth. It will be appreciated that the level of report detail provided is preferably adjusted by the system to be commensurate with the privacy settings and communication security.

The Loyalty Service determines (e.g., using a rule system) what type of reward to provide to the user in response to the action. A change in reward status is returned to the browser-embedded electronic data card application. The browser-embedded electronic data card application may update its display to reflect new reward status.

4. Reward System for Off-Line Use of an Electronic Data Card.

The user is given incentives/rewards in response to non-purchase activity performed at a location, such as a merchant location at which a reader-writer device is provided for issuing incentives for various activities (e.g., browsing the stock of merchandise, receiving a presentation, attendance at an event, receiving of a "rain-check", asking for a given offer from a clerk, and other on-location activity) at the location.

In this mode of the invention the incentive issuance, or issuance triggers, are provided from the kiosk which can also be considered to be the first computer having an electronic data card reader-writer.

The location-based incentive can be issued directly or through the Loyalty Service, such as determined by a rule system.

It should be noted that since the reward is based on off-line activity and the kiosk may not have real-time Internet access, then either: (i) an activity record can be written to the electronic data card and generally synchronized with the Loyalty Service the next time the card is on-line (i.e., detected by a reader-writer connected to an on-line device); or (ii) an activity record (i,e., token) can be saved at the reader-writer terminal and "synced" to the loyalty service the next time the reader-writer terminal is on-line (i.e., consider a kiosk that connects via modem on a daily basis).

5. Issuing Electronic Incentives to an Electronic Data Card.

Incentive offers can be received from the first computer in response to web site or location-based qualification determinations, or through the first computer in response, at least partially, to control by the loyalty computer programming. By collecting eCoupons in one place, the card holder can easily manage the coupons and choose when to redeem or delete coupons. Electronic coupons can be issued directly, or issued in combination with programming executing on a loyalty system computer configured for communicating with the first computers. For example, electronic coupons can be issued for storage on the electronic data card from an organization through the first computer in response to communication with the second computer which executes the loyalty program. Inclusion of loyalty computer processing increases security and control over Internet-wide coupon use.

In the case of on-line activity incentives web sites can distribute eCoupons through web pages that download coupons to an electronic data card application running within the browser. This can be generally referred to as a web site context for incentive offer issuance, and can be executed by the user on the user's own personal computer (i.e., home PC, laptop computer, or personal digital assistant) having Internet connectivity. One embodiment utilizes embedded browser technology such as ActiveX (or a plug-in, or similar functionality) so that web sites can support this form of electronic coupon distribution according to the invention while only needing to make minor changes to their web pages.

In the case of off-line activity incentives, the electronic coupons can be distributed via kiosks, or other computer systems associated with the organization and adapted with a card reader-writer, within the "real world" of physical locations (i.e., retail locations). This can be generally referred to as a physical location context for incentive offer issuance, and can be executed from kiosks, or similar points of user interface (non-browsing) wherein the electronic data card of the user interfaces with a computer system of an incentive issuer, or proxy thereof.

The following coupon issuance descriptions presume the user has first activated their electronic data card, such as by way of a standalone application, a web-based application, or an application/programming integrated within existing systems/applications such as at the point-of-sale, bank, and so forth. During activation the card is initialized. In a preferred embodiment the user is registered for the given card, wherein an association between the card and user can be considered to exist. Additional security aspects can be utilized if it is necessary to more securely identify that the person using the electronic data card is the user. During activation the user is registered within the community of users for the loyalty service (i.e., supported by the second computer).

By way of example, coupon distribution may be performed inclusive of any of the following methods; however, these examples are not be considered to limit the practice of the invention.

Method 1: Electronic Coupon Written to Card by Loyalty Computer
(1) User starts web browser.
(2) User browses to a web site partner of loyalty program.
(3) Programming obtains card identification and/or user identification from electronic data card application embedded in browser, which may be passed immediately to loyalty program or only if rewardable activity detected.
(4) Programming registers activity during browsing.
(5) Web site determines if activity matches a proscribed activity for which incentive is available.
(6) Web site issues a request for incentive to the loyalty program.
(7) Loyalty program determines if eCoupon is to be issued to the user.
(8) If determination=Yes:
  (i) Loyalty-system generates an eCoupon to electronic data card application embedded in browser; and
  (ii) Electronic data card application embedded in browser writes eCoupon to the card.

Method 2: Electronic Coupon Written to Card by a Web Site
(1) User starts web browser.
(2) User browses to a web site that issues eCoupons.
(3) Web site obtains card identification and/or user identification from electronic data card application embedded in browser.
(4) Web site registers activity that matches activity for which incentives are available.
(5) Web site determines whether or not to issue eCoupon.
(6) If determination=Yes:
  (i) Web site provides eCoupon to electronic data card application embedded in browser; and
  (ii) Electronic data card application embedded in browser writes eCoupon to the card.

Method 3: Electronic Coupon Written to Card by Loyalty Program
(1) User visits retail location with electronic data card kiosk (or other card communication infrastructure, such as point of sale systems).
(2) User presents card to reader-writer attached to kiosk.
(3) Kiosk application obtains card identification and/or user identification from electronic data card.
(4) Kiosk application determines whether to issue eCoupon.
(5) If determination=Yes:
  (i) activity and kiosk information is stored on electronic data card for later review by loyalty program which issues the coupon;
  (ii) activity and kiosk information are stored on kiosk for review (i.e., at a later time if non-real time access to Internet is provided) by the loyalty computer programming which issues the coupon.
(6) Loyalty program writes eCoupon to data card in a later synchronization process with the kiosk.

Method 4: Electronic Coupon Written to Card by Kiosk
(1) User visits retail location with electronic data card kiosk (or similar).
(2) User presents card to reader-writer attached to kiosk.
(3) Kiosk application obtains card identification and/or user identification from electronic data card.
(4) Kiosk application determines whether to issue eCoupon.
(5) If determination=Yes: kiosk writes coupon to electronic data card, optionally along with a kiosk identifier obtained recently (i.e., within 24 hrs) from the loyalty program. For example, using the kiosk identifier allows the loyalty program to maintain incentive offer security even in instances when the kiosk directly writes the offer to the card, thus preventing rogue kiosks from imitating coupon generation under the loyalty program. Numerous alternative security mechanisms can be utilized, for example, the electronic data card can be configured with protected areas of memory that can be only written to if the kiosk has a specific key value.

6. Storage and Maintenance of Electronic Incentives.

The system is preferably configured to facilitate the receipt, storage and redemption of electronic coupons on the electronic data card. This section describes aspects of incentive offer storage, maintenance, annunciation and similar storage related aspects.

In one embodiment of the invention incentive storage in the card is configured to store more than one level of offers. For example, conventional offers and "background" offers. The background offers comprise those offers which are subject to a lower probability of prospective use, lower possible frequency of use, having a longer expiration, or having been identified by the user as being of less relevance. The system can support any number of offer levels, such as according to a hierarchy, or based on categories of coupons. These levels and the control of how offers are handled are preferably subject to change in response to interaction by the user that can modify priority, modify category, and/or delete offers. In one embodiment the loyalty programming additional supports an incentive exchange feature allowing a first user to put up offers for exchange with other users of the program. For example a second user may offer one or more offers in exchange with the user putting up the offer. In this embodiment an optional field within each incentive record allows the incentive issuer to determine whether the transference of the offer is to be allowed.

The system is preferably configured at the first computer through the browser plug-in or other invention related programming, or through the second computer of the loyalty program, to display any of these offers, as well as to manage them, such as deleting expired offers, viewing in expiration order, tagging them, moving to other offer categories (when multiple categories defined such as "background"). In one embodiment, user alerts can be generated in response to approaching the expiration date for the most important offers, and/or offers specifically selected by the user. The alerts are preferably generated as email alerts from the loyalty program in accord with user settings. Alternatively or additionally, the alerts can be generated by the first computer, in particular if it is registered for the user, or it may be generated from the electronic data card device itself if it is configured with an annunciation means (i.e., display or audio output means) such as integrated within a phone, PDA, or the like.

In one embodiment of the invention the electronic data card comprises a portable memory bearing device which incorporates a global positioning system (GPS) device and a user interface. As an example of this device type consider cell phones and PDA which include built in GPS devices. According to an aspect of this embodiment the programming is optionally configured to organize the available offers with respect to the proximity of the user to a location at which the coupon can be redeemed.

Each off-line offer retained in the system preferably includes data fields for storing one or more sets of coordinates associated with off-line locations for redeeming the offer (and/or for receiving an incentive offer). The location or locations in the offer can be readily referenced to the physical location of the user in response to the current GPS location, or in one mode according to common travel paths of the user. This mode also aids the user in selecting which off-line offers they want to redeem, for example by viewing a map of the redemption locations and deleting unwanted offers, or changing the priority of other offers. The loyalty database itself can be optionally configured for providing location based incentive information and have a database of incentive information with associated location coordinates. In this way the organizations need not generate their own coordinate information, but it is collected from the loyalty database for that incentive, either automatically under program control or in response to user selection.

In one mode the system is configured with programming that will annunciate alerts to the user when the user is sufficiently proximal to a location at which a retained offer can be redeemed. In a preferred embodiment the user can select under which conditions they are to be alerted to the proximity of a redeemable offer. In one mode the user would mark the offers for which they would like a proximity alert. In another mode the user can store information about incentive offers that they want to obtain, wherein the GPS proximity mode can trigger and annunciation to the user when they are near that location.

In one aspect of the invention the card activation processing includes the step of pre-loading the card with a set of offers. The card being configured for retaining a portion of the offers in a background list of offers, or at any desired level within a hierarchy of offer levels, which can be controlled by the user. The background offers are preferably redeemable over a long term, such as a year.

In addition to selecting which offers are stored and at what priority, the present system preferably assists the user in maintaining electronic coupons. The system is preferably configured for displaying incentive offers stored on the electronic data card. In one mode, the user may access their data card via the card reader attached to the user's own personal computer, or through other systems for which sufficient information is provided to assure security. Alternatively, the user as a participant in the loyalty program can access the loyalty server and after a secure log in process can view the incentive offers which have been stored on their card.

In one embodiment, the loyalty computer stores information about all offers issued and redeemed, wherein it can track the offers stored in the electronic data card of the user. Therefore, the loyalty program computer need not have access to the electronic data card, in order for the user to display and maintain the set of offers. If the user reorganizes, deletes or otherwise changes the stored offers, then upon next connecting to the loyalty computer, the offers and optionally imposed hierarchy in the database of the loyalty computer are duplicated in the offers retained on the card, therein synchronizing the card and loyalty computer.

In one embodiment, offer information from the electronic data card can be viewed from kiosks, or other location-based devices, which are configured for establishing connectivity with the electronic data card. Programming is provided on the kiosks to allow the user to select offers for redemption as well as to synchronize the electronic data card with the database of the loyalty computer (presuming the location-based kiosk has active connectivity with the loyalty computer), and optionally to perform simple maintenance procedures.

It should be appreciated that synchronizing the offers between the loyalty computer and the electronic data card provide an increased level of security wherein offers written directly to the card by hackers are invalid as they do not match up with offers recognized as issued by the loyalty computer.

The system according to one aspect is configured to automatically erase expired offers, or offers whose value has slipped below a threshold, such as established by the user. The system can allow the user to set criterion to control which offers are stored and which are deleted. According to one feature the hierarchy of incentive offers can be fully or partially ordered in response to a list of preferred vendors (i.e., merchants frequently visited by the user). Value can be assessed in relation to a number of factors including, expiration, location, timing, comparison with recent purchases (i.e., user has already obtained "Widget A" for which they have a coupon), vendor status as preferred or non-preferred, and so forth.

According to another feature the user is alerted to higher priority offers which will be expiring within a short time (i.e., established by the user for a given category of offers or a specific offer). In another aspect the user can specify a time frame when they may want to be reminded about the offer, for example they recently ate at a given restaurant and would consider going back to use their coupon after for example three weeks have passed. The user in the case need not delete or send the coupon to the background but can defer it until later, or have its priority increase with respect to time after a given timeframe.

According to another mode of the invention, the loyalty service, or another party provides a means for allowing participants in the loyalty program to exchange incentive offers with one other, therein improving the opportunity of the user to avail themselves of incentive redemption, while the issuing entity can increase visibility and attract new customers.

According to another mode of the invention, the system can store incentives on the electronic data card in response to the purchase of an electronic coupon book having a plurality of offers for goods and/or services. For example one popular paper-based coupon book is the Entertainment Book™, which provides two-for-one and other discount incentives for hundreds of restaurants and entertainments. According to this aspect of the invention the user purchases a set of coupons, such as over the Internet. These coupons are then loaded into the device. Preferably each coupon is also coded with a coordinate location, wherein the user can peruse the coupons and select those that they wish to be alerted to in response to proximity, and/or timing.

According to one feature of the invention, the system is configured to allow the user to download incentive offer information from an incentive issuer. This information is useful if the user wishes to qualify for the offer before making a subsequent purchase, or in the scenario in which the user wants to exchange one of their incentives with another party which has qualified for a transferable incentive at that merchant or organization. The information can be readily downloaded from websites, preferably according to an XML process, or another form of standardized data exchange mechanisms wherein the user need not search the site for locating this information and copying to a usable format for data exchange.

It should be appreciated that the storage alternatives described above are by way of example and can be implemented separately, or in various combination, both with elements herein and that which is known to one of ordinary skill in the art, without departing from the teachings of the present invention.

7. Redeeming Electronic Coupons from Electronic Data Card.

To determine which coupons are redeemable, a selection process takes place. In one mode, the electronic coupons stored on the card are read and compared with acceptable offers for a merchant or organization. In one mode only unexpired coupons are checked for matching the vendors, otherwise the check can be performed after matching the offer. By way of example, the electronic data card application programming being executed for reading the card, such as in the first computer which may be embedded in a web browser. Electronic coupons are read from the card, or only offers associated with the given merchant or organization, and an offer matching process is commenced.

By way of example, a match occurs in response to: (1) issuer of the electronic coupon is found to be the same as the fully qualified domain name (FQDN) of the site providing the web page being currently browsed, (2) identification of the specific offer matches an existing offer code supported by the organization in relation to the web site. In addition, the web page may contain an input field for a coupon code. In one embodiment of the programming, if a match arises then the electronic data card application offers the user the ability to auto-fill any data input field, using the coupon code associated with the matching eCoupon on the electronic data card. This mode provides compatibility with existing user-supplies-coupon-code web sites.

One embodiment would make use of an embedded browser technology such as ActiveX or a plug-in so that web sites can support this form of eCoupon redemption without making changes to their web pages.

In one embodiment the system locates all offers available for the current situation. One feature of the invention displays the offers in order from highest value to lowest value. Offers of equal, or similar value, also subject to comparison of expiration, therein allowing the user to redeem coupons with earliest expiration dates first.

Once one or more redeemable offers are found the system according to one mode of operation solicits the user to select which coupon is to be used. If sufficient information is available on the offers, the system can prompt the user indicating if any of the offers may be combined within one another to increase the available reward.

By way of example and not limitation, coupon redemption may be performed inclusive of any of the following generalized methods.

Method 1: Electronic Coupon Redeemed at Web Site
(1) User starts a web browser.
(2) User browses to a web site.
(3) Electronic data card application embedded in browser determines if there are one or more matching eCoupons for the web site. A match occurs if the site matches the issuer ID of an eCoupon stored on the card, the page contains an input field for a coupon code, and the eCoupon has not expired.
(4) In case of a match: the electronic data card application embedded in the browser alerts the user (e.g., modifies the visual appearance of the page, displays a pop-up, or enables a visual control, and so forth) and the user is given the ability to automatically communicate the data to the web site or to "auto-fill" coupon codes, or other data fields, in the web site as necessary.

Method 2: Electronic Coupon Redeemed at Kiosk
(1) User visits retail location with electronic data card kiosk.
(2) User presents card to reader-writer attached to kiosk.
(3) Kiosk application determines whether card contains a redeemable eCoupon.
(4) If redeemable: Kiosk application reads the coupon code from the card and triggers reward generation for receipt by the user. It should be appreciated that the kiosk can interconnect with (or be integrated with) a purchase system wherein the reward can comprise a discount, rebate, purchase incentive (e.g., two for one, x % off second purchase, quantity discount, direct rebate, combination offer with another purchase, and so forth). The reward may comprise free goods (e.g., bags, bonus items, gift certificates, and so forth) which are given from the location of the kiosk to the user.

The present system describes the distribution and redemption of incentives for electronic data cards, and similar memory bearing devices adapted for communicating with kiosks, transaction infrastructures, and through card readers and writers configured for permanent and/or intermittent connection to the Internet. The incentives being processed are preferably of a non-purchase based activity origin, however, it should be appreciated that aspects of the invention can be applied to incentives provided in response to purchases and transactions, without departing from the teachings of the present invention.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. An apparatus for executing an incentive program based on electronic data card devices for providing incentives for non-purchase activity, comprising:

an electronic data card application executable on a first computer and configured for accessing an electronic data card in response to establishing connectivity between said electronic data card and said first computer;

card identification means for identifying an electronic data card being accessed by said first computer which has been registered for use within a non-purchase incentive program;

activity registration means for registering browsing of a user to capture non-purchase on-line activities of the user in response to browsing performed within a computer application configured for user browsing of web sites;

incentive generation means for generating incentives for storage on the electronic data card being accessed in response to selected activity being registered by said activity registration means with regard to an issuing web site or location; and usage data generation means for reporting usage data in response to registering information about incentive issuance and/or redemption.

2. An apparatus as recited in claim 1, wherein said card identification means comprises card application programming executable by a first computer interfaced to a card reader-writer device to which an electronic data card can establish a communication connection.

3. An apparatus as recited in claim 1, wherein said electronic data card is selected from the group of portable memory bearing devices configured for establishing interconnectivity with a reader-writer device consisting essentially of smart cards, digital wallets, cellular phones, personal digital assistants, and FLASH drives.

4. An apparatus as recited in claim 1:
wherein said activity registration means further comprises off-line non-purchase activity registration programming configured for capturing activity information from a kiosk in response to an off-line activity which can be identified by the kiosk.

5. An apparatus as recited in claim 1, wherein said incentive generation means comprises programming operable on said first computer, or a computer in communication with said first computer, for generating an incentive offer for storage on an electronic data card in response to matching the on-line activity of the user with the activities proscribed by a particular organization for receiving a given incentive offer.

6. An apparatus as recited in claim 1, wherein said usage data generation means comprises programming operable on a second computer, or loyalty server, coupled to said first computer for registering activities communicated to said second computer to maintain said usage data.

7. An apparatus for executing a program of electronic non-purchase activity generated incentives for storage on an electronic data card within a plurality of said data cards associated with participating users of said incentive program, comprising:

(a) a first computer configured for communicating over an electronic network and adapted for reading and writing data from an electronic data card having memory configured for aggregating information about incentive offers;

(b) incentive offer issuance programming operable on said first computer for,
detecting the presence of an electronic data card having connectivity with said first computer,
reporting activity arising from non-purchase actions performed within a web site context of a browser executing on said first computer from which incentives are offered,
said reporting of activity comprising registering user browsing to capture non-purchase on-line activities of the user in response to browsing performed within a computer application configured for user browsing of web sites;
generating an incentive offer from said first computer in response to select non-purchase activities matching on-line activity with the criterion for issuance of said on-line offer by a given web site configured by an incentive offer issuer for determining qualification for the offer and issuing the incentive, and
storing said incentive offer received in response to non-purchase activity within said electronic data card;

(c) incentive offer redemption programming operable on said first computer for,
detecting the presence of an electronic data card having connectivity with said first computer,
displaying available incentives stored on said electronic data card,
detecting if any available incentives stored on said electronic data card are redeemable at a web site being accessed or within said first computer associated with a physical location,
displaying redemption options and collecting user input on offers to be redeemed, and
executing redemption of one or more incentives stored on said electronic data card and erasing or inactivating redeemed incentives;

(d) a second computer configured for communicating over the electronic network with said first computer; and (e) programming operable on said second computer for aggregating information received from a plurality of said first computers about off-line and on-line activity.

8. An apparatus as recited in claim 7, wherein said second computer further comprises programming for determining or validating the incentive offers generated by said first computer.

9. An apparatus as recited in claim 7, wherein said programming is configured for generating the incentive in response to non-purchase activity based on on-line activity arising across one or more web sites that need not be integrated to one another which are configured for qualifying the user for receiving the incentive offer.

10. An apparatus as recited in claim 9, further comprising:
programming for qualifying the user for receiving the incentive offer that comprises detecting non-purchase activity at physical locations; and
wherein said programming for qualifying the user for receiving the incentive offer is responsive to and selected from the group of activities consisting essentially of: attendance at a location or event, participation in a physical program, a demonstration, a presentation, and/or user requesting of an incentive.

11. An apparatus as recited in claim 7:
wherein storing of said incentive offer is performed at a later time in response to communication between said first computer and said second computer; and
wherein said second computer validates the incentive offer for storage on said electronic data card.

12. An apparatus as recited in claim 11, wherein storage of said incentive offer comprises storing a token of the activity for which an incentive offer is available, in either the electronic data card or the first computer, and conversion of the token to a redeemable incentive by said second computer in response to communication between said first computer and said second computer.

13. An apparatus as recited in claim 7, wherein said electronic data card is a portable memory bearing device configured for establishing interconnectivity with a reader-writer device and selected from the group of electronic devices consisting essentially of smart cards, digital wallets, cellular phones, personal digital assistants, and FLASH drives.

14. An apparatus as recited in claim 7, wherein said detecting if any available incentives stored on said electronic data card are redeemable is performed in a matching process in which stored incentive offers are compared against incentive offers which are accepted at either a given web site, or at a physical location at which said electronic data card has established connectivity.

15. An apparatus as recited in claim 7, wherein the programming of said first computer further comprises collecting additional information in at least one field of a data form from a user associated with said electronic data card in response to said detection of available incentives.

16. An apparatus as recited in claim 15, further comprising programming on said first computer or said second computer for automatically populating at least a portion of the fields within said data form from information available to said first computer or said second computer.

17. A method of issuing, redeeming, and monitoring incentive offers which are generated for on-line non-purchase activity, said incentive offers are stored on an electronic data card, comprising:

accessing an electronic data card having memory configured for aggregating incentive offers retained in an electronic form;

issuing incentive offers for storage on said electronic data card in response to matching on-line actions performed within a web site context of a browser with issuance criterion;

said incentives generated in response to registering user browsing to capture non-purchase on-line activities of the user in response to browsing performed within a computer application configured for user browsing of web sites;

redeeming incentive offers stored on said electronic data card in response to detecting if any available incentives stored on said electronic data card are acceptable for redemption upon submission to a web site; and generating usage data based on aggregating incentive offer issuance and redemption information.

18. A method as recited in claim 17, further comprising determining whether or not to store an incentive offer on said electronic data card in response to user selected incentive offer acceptance criterion.

19. A method as recited in claim 17, further comprising issuing of incentive offers based on off-line activity within a kiosk;

wherein issuing of incentive offers is performed by storing an activity token in response to said off-line activity, and then conversion of the activity token by a loyalty server in response to communication being established between said kiosk and said loyalty server.

20. A method as recited in claim 17, wherein said electronic data card is a portable memory bearing device configured for establishing interconnectivity with a reader-writer device which is selected from the group of electronic devices consisting essentially of smart cards, digital wallets, cellular phones, personal digital assistants, and FLASH drives.

* * * * *